May 9, 1939.  S. S. MILLEN  2,158,011
BEAD-FORMING MACHINE
Filed Dec. 20, 1937  5 Sheets-Sheet 1

INVENTOR.
Stanley S. Millen
BY
ATTORNEY.

May 9, 1939. S. S. MILLEN 2,158,011
BEAD-FORMING MACHINE
Filed Dec. 20, 1937 5 Sheets-Sheet 2

INVENTOR.
Stanley S. Millen
BY Robt. H. Woolsey
ATTORNEY.

May 9, 1939.   S. S. MILLEN   2,158,011
BEAD-FORMING MACHINE
Filed Dec. 20, 1937   5 Sheets-Sheet 3
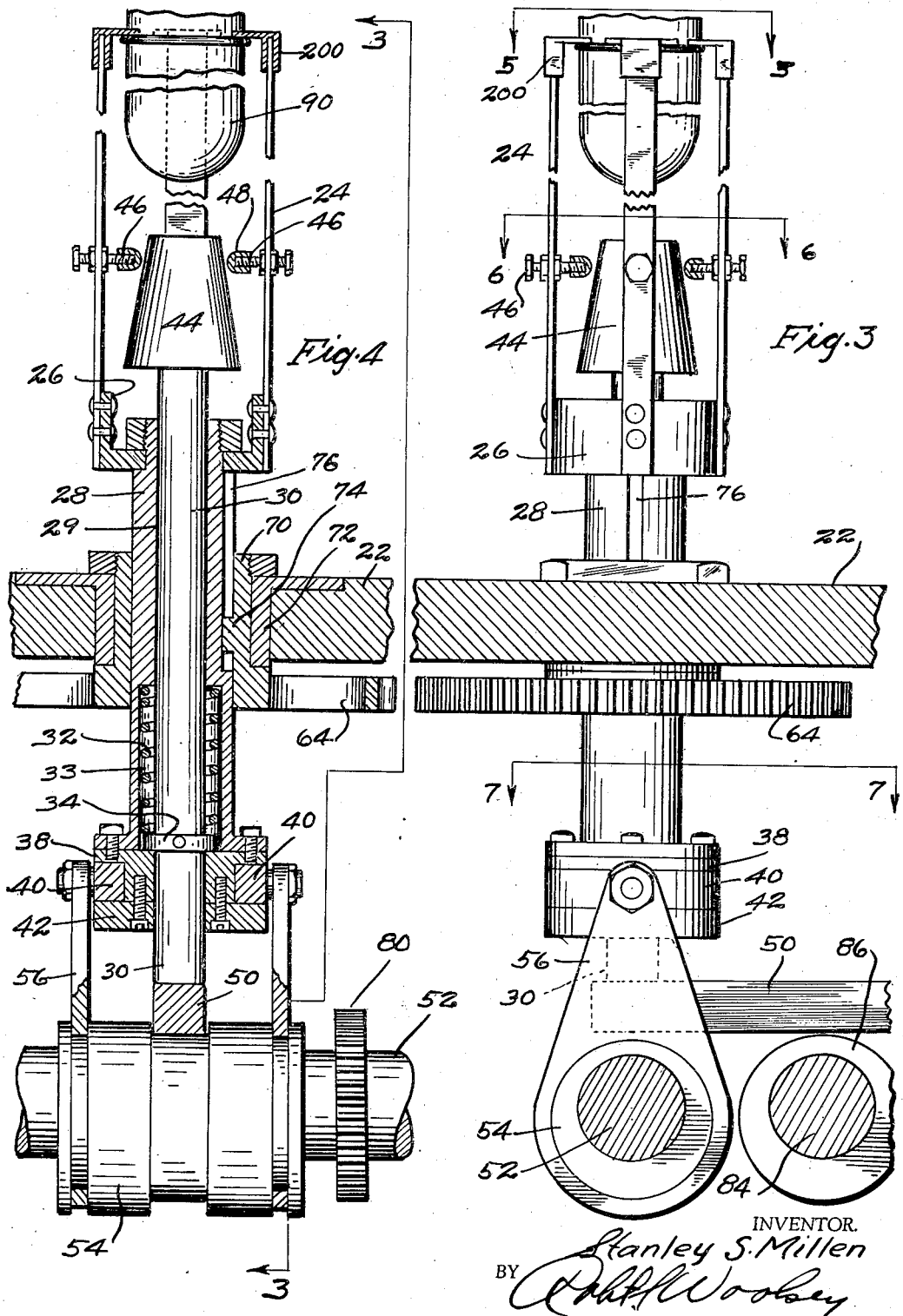

May 9, 1939.                S. S. MILLEN                2,158,011
                         BEAD-FORMING MACHINE
                       Filed Dec. 20, 1937           5 Sheets-Sheet 5

INVENTOR.
Stanley S. Millen
BY Robt. P. Woolsey
ATTORNEY.

Patented May 9, 1939

2,158,011

UNITED STATES PATENT OFFICE 2,158,011

BEAD-FORMING MACHINE

Stanley S. Millen, Glendale, Calif., assignor to Julius Schmid, Beverly Hills, Calif.

Application December 20, 1937, Serial No. 180,791

2 Claims. (Cl. 18—2)

The machine of this invention relates to mechanical means to form an annular bead on thin rubber articles, and is in particular an improvement upon my present pending co-application for Letters Patent, entitled Beading machines, Serial Number 97,761 as filed August 25th, 1936, being an improvement thereupon in the particulars to be herein subsequently pointed out.

It is therefore a prime object of the present invention to form an annular bead on thin rubber goods by reciprocation of fingers in constant contact with a form upon which the goods are positioned, the said fingers being so formed as to engage the annular edge of the goods and to force the same downwardly in an annular pile and/or into an annular ring having a cross-section formed in spiral with the uppermost edge being the nucleus of the spiral.

A further object of the invention resides in the inclusion of simple structural elements to effect the formation of an annular bead as aforementioned, which elements may be rapidly reciprocated to expeditiously form the said bead.

A still further object of the invention is to provide in a machine of the character contemplated, a simple, reliable, efficient, rapid, and relatively low cost bead forming unit.

Other objects, features, and advantages of the machine may be observed from the accompanying drawings, the specification, and the appended claims.

In the drawings of which there are five sheets:

Figure 3 is a side elevation of a single unit used to form an annular bead, the unit being preferably used in consert with a multiple number of like units all synchronously functioning in the production of work.

Figure 4 is a vertical sectional elevation of the unit shown in Figure 3.

Figure 1:
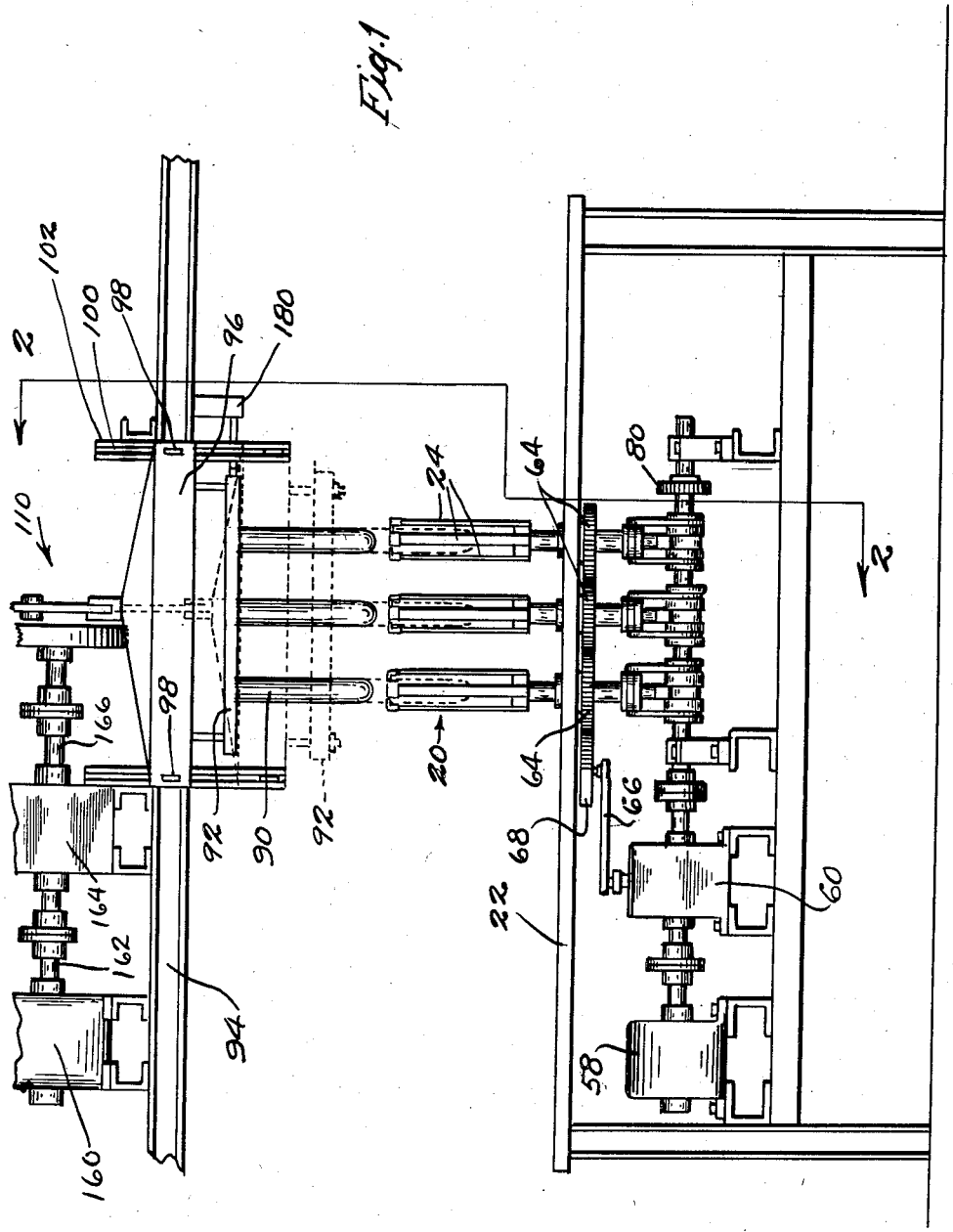
Figure 1 is a side elevation showing three of the bead forming units of which there may be a greater or lesser number, the said units being in operative position with respect to other co-related mechanism.

In the drawings as shown, the bead forming units 20, of which there may be any reasonable number, are operatively mounted upon a table 22 or other suitable support.

The units 20, as shown in particular in Figures 3 and 4, comprise a plural number of fingers 24 which are in spaced relation one to another and are mounted upon a suitable frame or spider 26 which is secured upon the upper end of a reciprocable body 28 which is cored at 29 to receive a shaft 30 in slidable relation thereto. The core 29 being sufficiently enlarged in the lower portion of the body 28 to receive an extensile spring 32. One end of the spring 32 being in abutment with the upper wall of the enlargement 33, while the lower end of the spring rests upon a washer or flange 34 which is mounted upon the shaft 30, which is constantly urged in a downward direction by reason by natural compression and additional compression which is added supplementary thereto in a manner to be hereinafter described.

The lower extremity of the body 28 is flanged at 36 as shown and is bolted or otherwise secured to a flanged collar 38. A ring 40 is adapted to be fitted over the collar 38 substantially in the manner shown, and to be retained in such position by means of a cap 42 held in position by screws 43 or other kindred and suitable means.

The upper extremity of the shaft 30 is provided with a tapered thrust cam 44 which is adapted to intermittently slide under adjustable screws 46 having anti-friction caps 48 upon the free ends thereof. The lower end of the shaft 30 is in engagement with a bar 50 forming a finger lifting means to be subsequently described.

Greatest efficiency will doubtless be obtained by operating multiple numbers of the units in parallel rows, and accordingly with this arrangement in mind, I place a power shaft 52 in central alignment with each of the above mentioned rows of units of which the shaft 52 and the units shown are symbolical. The shaft 52 is provided with cams 54 which reciprocate the central body 28 and fingers 24, by means of pitmans 56 which are operatively positioned upon the cams 54, and connected to the ring 40 in the manner shown or other good and sufficient way.

The shaft 52 is driven by a power source such as a motor 58 operating through a gear reduction box 60. However it should be here pointed out that while the shaft 52 is shown as coming from the reduction box 60, this showing is not to be construed as meaning that the shaft 52 operates at any relatively slow speed, for quite the contrary is the case, rather the reduction box is thus shown to effect simplicity in the drawings. The speed reduction box being used primarily to effect a relatively slow oscillation of the gears by means of a crank 66 operating from and driven by such gear speed reduction box 60. The gears 64 are in train and are driven by a half gear 68 or other suitable connection between the crank 66 and gears 64 in train. Reference to Figure 4 will show that each of the gears 64 are formed with a hub 70 which is journalled in a bearing 72 secured in the table 22. The hub 70 is provided with a key 74 which is adapted to operate within a groove 76 to keep the body 28 in rotatable position or relation with the gears 64 as they are oscillated by crank 66.

A gear 80, upon each of the shafts 52, is adapted to drive a gear 82 upon an idler shaft 84, while a cam 86 having an identical throw as compared with cam 54, is adapted to follow rotation of cam 54 in rotation under the bar 50.

The machine of this invention is adapted to operate in combination with forms upon which the rubber goods are positioned there being one form for each of the units 20. And as previously stated, in order to obtain greatest efficiency in operation of the present machine, it is necessary that a multiple number of units 20 be simultaneously operated, likewise a similar or like number of forms 90 are brought in use for co-operative action with the units 20.

The forms 90 are secured in groups upon a form board 92 from an overhead conveyance system 94, to a vertically movable form board support 96. The support 96 being guided in its vertical path by suitable guides, such as lugs 98 which are slidable within grooves 100 formed in the dependently positioned guide bars 102.

In order that the form boards 92 may move in timed relation with respect to operation of the units 20, it is necessary that a mechanism be installed to effect such timed or synchronous operation.

Figure 2:
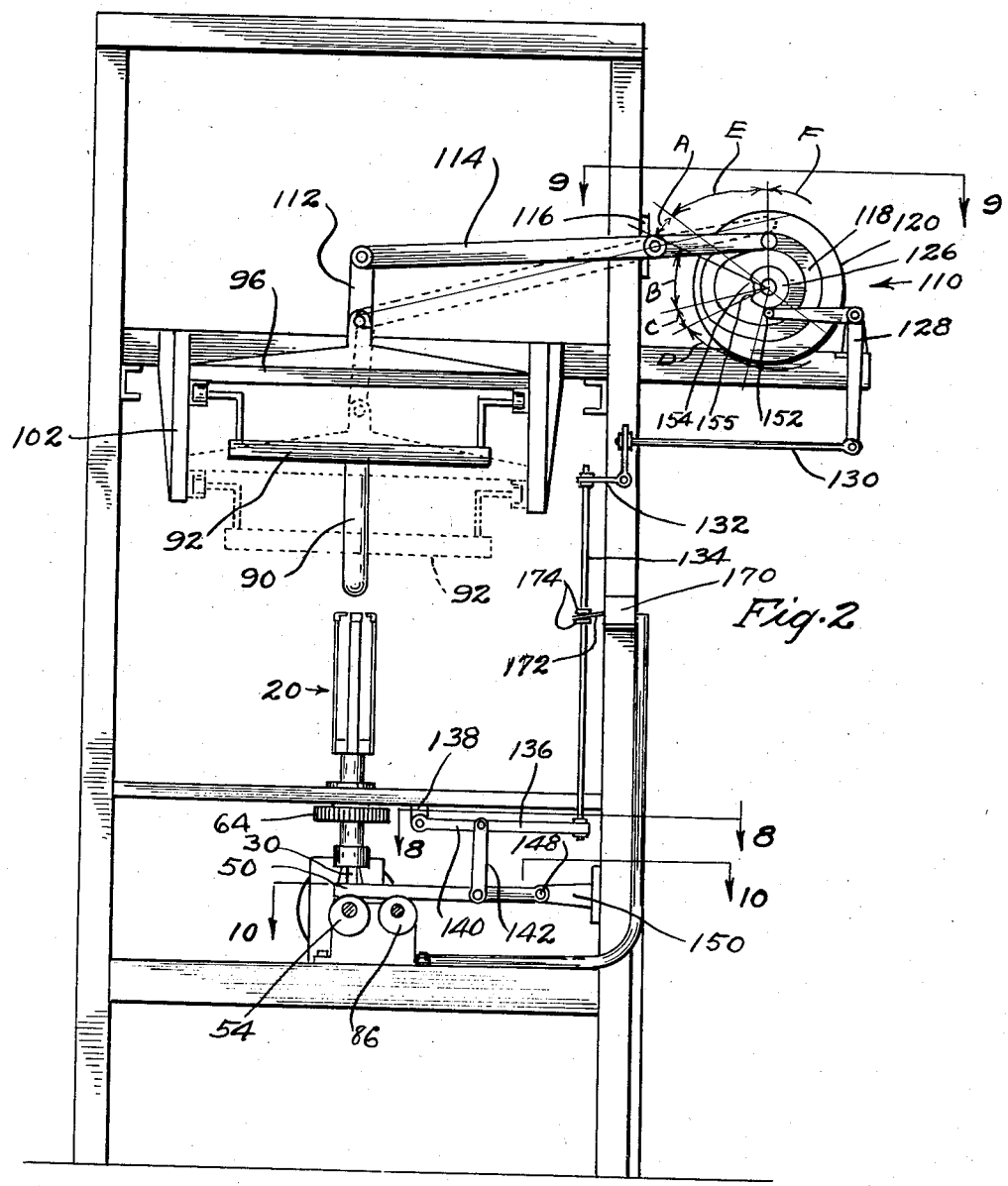
Figure 2 is a sectional elevation taken substantially on line 2—2, Figure 1 showing construction.
Figure 5:
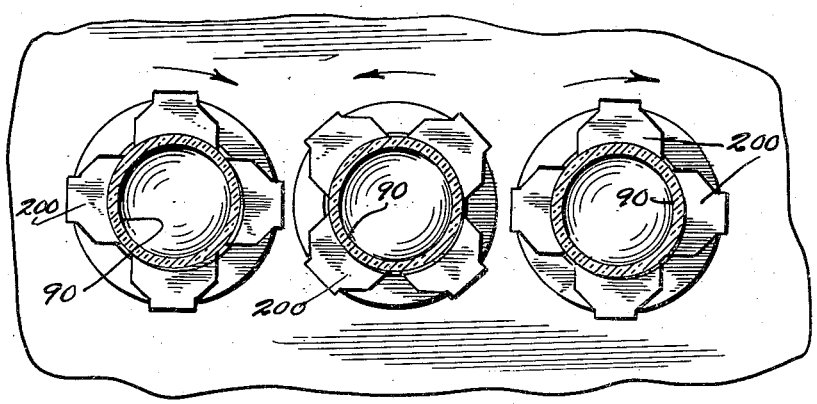
Figure 5 is a plan view in section, taken on line 5—5, Figure 3.
Figure 6:
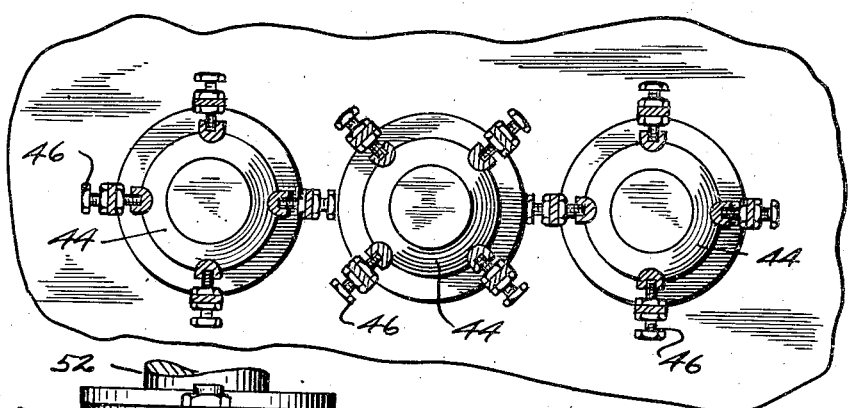
Figure 6 is a plan view in section, taken on line 6—6, Figure 3.
Figure 7:
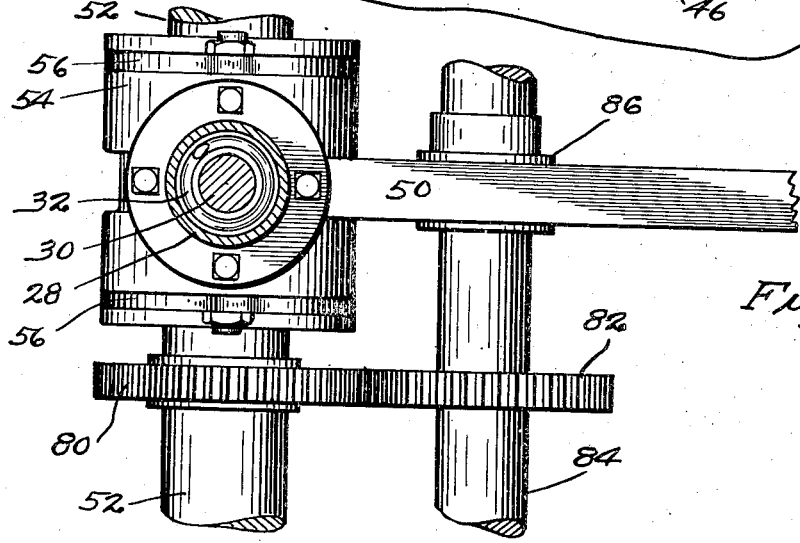
Figure 7 is a plan view in section, taken on line 7—7, Figure 3.
Figure 8:
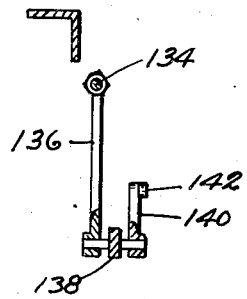
Figure 8 is a detail taken on line 8—8, Figure 2, showing finger lifting mechanism.
Figure 9:
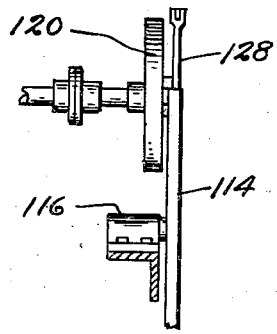
Figure 9 is a plan view of one form of cam adapted to periodically operated certain of the accessories of the machine of this invention.
Figure 10:
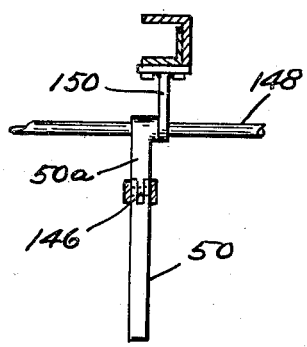
Figure 10 is a detail taken on line 10—10, Figure 2, showing additional detail in connection with the finger lifting mechanism.
Figure 11:
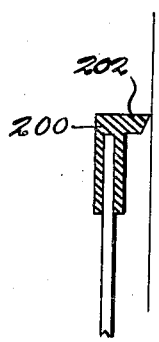
Figure 11 is a detail in section, of one of the tips on the beading fingers showing an approximate angle of incidence between the face of the finger tip and the vertical wall of the bottle or form upon which the goods is mounted.

By referring to Figures 1 and 2 it will be observed that the structure indicated in general by the reference character 110 is adapted to bring the movement of the form board 92 into synchronism with operation of the beading units 20. A link 112 joins the form board support 96 with an oscillatable beam 114 which is fulcrumed in a bearing 116, while its opposite end is provided with conventional anti-friction means which operates within and follows a cam groove 118 formed in a cam wheel 120, thus forming a practical means to raise and lower the form board 92 and its support 96.

In operating the machine of this invention it is necessary that four distinct periods be provided for, as follows:

(1) Spreading the fingers 24 to receive the work.
(2) Closure of the fingers to contact the form(s) and continuance of such closure for duration of the beading operation.
(3) Opening of the fingers to permit removal of the work.
(4) Continuance of such finger opening during such interval as is necessary to remove finished work and placement of new work in bead forming position.

The foregoing action sequence is provided for in the cam groove 118, for by reference to Figure 2 it will be noted that the groove is provided with a plural number of surfaces each of which is of different degree or magnitude for the purpose of accomplishing the above set forth operations.

The area (cam surface) delineated by the letter "E" is brought into functioning position to effect lowering of the form(s) to beading position. The area "B" denotes bead forming position. The area "D" denotes lifting the forms after the beading operation, while the area "F" denotes the period during which the fingers spread for the purpose of removal and placement of work.

A second cam indicated by the reference character 126 is adapted, through arm or bell-crank 128, link 130, bell-crank 132, and rod 134, in association with lever 136 fulcrumed to bearing 138, and having a shorted arm 140, and link 142, to apply downward pressure upon the bar 50 which is hinged at 146 to the bar 50a fulcrumed upon a shaft 148 journalled in bearings 150, to move the fingers 24 in divergent directions by reason of the fact that shaft 30 is forced upwardly carrying the tapered cam 44 against the anti-friction caps 48 on adjustable screws 46.

It is to be noted that the bell-crank 128 is operated only when its rider 152 passes over one of the faces 154—155 of the cam 126, which operation is obtainable during the previously referred to cam action under the caption, cam area "B". By reference to the drawings it will be noted that cam groove 118 is provided with increased pitch "A" in a segment of the wheel which coincides with the cam face 154 in the cam 126, the action of which, working through the previously described linkage, effects, closure of the fingers 24 upon the form 90. Likewise the groove 118 is provided with a second area of increased pitch "C" which returns the cam to the degree of pitch delineated under the caption "D", to effect opening of the fingers 24 through the previously described linkage.

The cam wheel 120 is driven by a power source 160, shaft 162, speed reduction casing 164, and shaft 166 which as shown carries the cam wheel 120.

The bead forming units may either be driven continuously or they may be driven intermittently. If the later method of operation is chosen, then a convenient method of effecting such operation could be achieved by actuation of a switch 170 by means of the rod 134. The throw of switch arm 172 being determined by collars 174 secured upon the rod 134 as shown, thus when the rod is raised and lowered the switch 170 will be alternately opened and closed to effect energizing the motor 58. Likewise the motor 160 may be driven continuously or intermittently, if the later method of operation be chosen, closure of the electric circuit to the motor may be effected by interposition of a switch 180, which is opened and closed by removal of finished work on board 92 and closed when a board of new work is placed in position to be lowered to beading position.

In describing the operation of the machine of this invention, reference is made to my patent, entitled Bead forming machine, Serial Number 44,555, dated January 12, 1937, as well as the present copending application previously referred to, in order that certain phases of operation previous to and subsequent to the operation of forming a bead on thin rubber goods of the character contemplated.

With an understanding of steps taken preceding beading, it is only necessary to cause a form board to move either manually or automatically to the position shown in Figures 1 and 2, after which the form board 92, which has been rolled upon the support 96, is lowered by operation of beam 114 and cam wheel 120. The bell-crank 128 because of action of cam 126, and linkage members 130, 132, 134, 136, 140, 142 and bars 50, 50a, applies downward pressure upon the bar 50 which is rocked over its rotatable fulcrum 86 (cam) and lifts the central shaft 30 to spread the fingers 24 in the manner previously mentioned.

During operation of the machine of this invention, the fingers and central shaft 30 move in unison, this feature is made possible by reason of the fact that the shaft 30 is provided with the collar 34, thus forcing the shaft to rise in unison with reciprocation with the pitmans 56 while spring 32, forces the collar 34 and shaft 30 downwardly during the downward stroke of the pitman's 56.

In order that the fingers 24 may be spread at any time required and without jarring and to effect smooth and continuous operation, it is necessary that the fulcrum (cam) be in matched alignment with the cam 54, and that the bar 50, ride upon the cam 86 on the one hand and that it's free end ride upon the cam 54 or in slight clearance thereof this making it possible to pivot the bar 50 upon its fulcrum to lift the fingers 24 during any phase of machine operation.

Reference is now made to the tips of the fingers 24, for especial note is to be made of the tip and its construction with respect to forming the bead on the goods.

Figure 12:
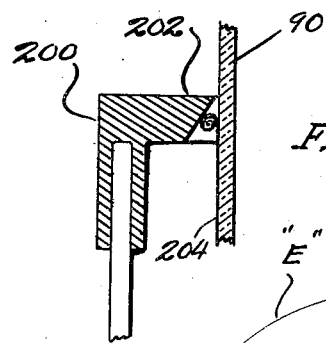
Figure 12 is similar to Figure 11 except that the scale is enlarged to show how the bead may be rolled into an annular ring having a spiral cross-section.
Figure 13:
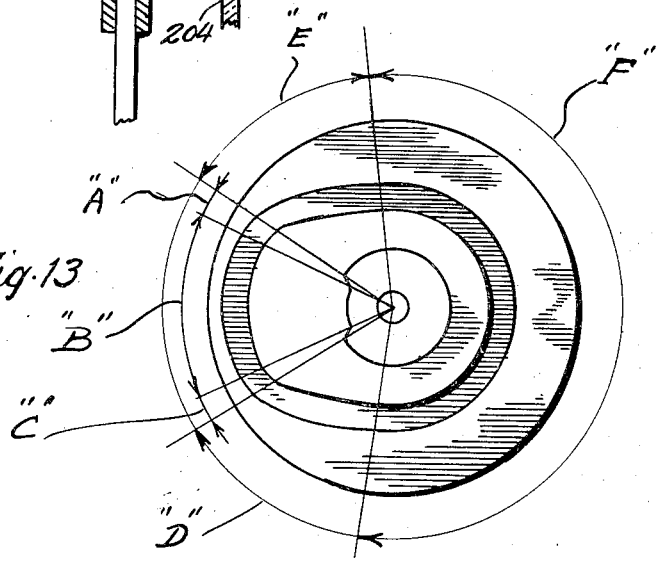
Figure 13 is a detail of the cam shown in Figure 2.

The tip 200 may be made of fibre or other suitable material and is provided with means for attachment to the spring steel ends of the fingers 24. The tips 200 are provided with a degree of overhang 202, the inner edge of which is intended to contact the sides of the forms 90 in order that the upper edge of the rubber goods 204 may be forced downwardly into an annular bead either by rolling the wall material of the goods in spiral form (as seen in cross-section) or by hammering the same from a higher point to a lower level. This action is best accomplished by undercutting the inner face of the tip in such manner that only a portion thereof is in contact with the form 90, while the under surface of the tip is in clearance of the form as shown in Figure 12, thus facilitating the actual rolling of the bead and tending to press the laminae thereof into firm and homogeneous mass.

It will be readily apparent to those skilled in the art to which the device or machine of this invention refers, that various of the structures employed in the specification and the drawings are in their nature symbolical rather than representative of exact structure to be employed in actual commercial operation, for example, the over-head conveyor 94, the automatically operated switch 186, the linkage as indicated by the numerals 128—150, the arrangement of the crank 66, the location or position of the several operating elements or their equivalents are all generic to proper functioning of the assembly, are not to be construed as being replicas of structure to be employed, as above stated, and in view thereof applicant is concerned with the spirit of the invention rather than detail thereof, reserving to himself all right to equivalent means of operation in the spirit of the disclosure herein made.

I claim:

1. A machine to form an annular bead on thin rubber articles supported upon forms, a beading unit for each of said articles, a body portion in each of said units, said body portions having a plural number of fingers adapted to engage and release said articles, a horizontal cam shaft, cams on said shaft, pitman rods operated by said cams and joined to said body portion whereby said body portion and fingers may be vertically reciprocated, a vertically positioned shaft extending through said body, a cam upon said last mentioned shaft to spread said fingers, gears to oscillate said body portion around the medial vertical axis of said vertically positioned shaft, and means to intermittently raise and lower said vertical shaft to spread said fingers, said means comprising a bar positioned under said vertical shaft and extending laterally therefrom, a fulcrum for said laterally positioned bar, a third cam, said last mentioned cam being rotated in timed sequence with formation of said head, and linkage joining said last mentioned cam and the free end of said laterally positioned bar to raise and lower the same whereby the cam on said vertical shaft may be moved to spread said fingers.

2. A machine to form an annular bead on thin rubber articles supported upon forms, a beading unit for each of said articles, a body portion in each of said units, said body portions being provided with a plural number of fingers adapted to engage and release said articles, a horizontal cam shaft, cams on said shaft, pitman rods operated by said cams and joined to said body portion whereby said body portion and fingers may be vertically reciprocated, a vertically positioned shaft extending through said body, a conical cam upon said last mentioned shaft to spread said fingers, gears to oscillate said body portion around the medial vertical axis of said vertically positioned shaft, and means to intermittently raise and lower said vertical shaft to spread said fingers, said means comprising a bar positioned under said vertical shaft and extending laterally therefrom, a rotatable fulcrum for said laterally positioned bar whereby said bar may move in synchronism with said body portion to synchronously engage said vertical shaft, a third cam, said last mentioned cam being rotated in timed sequence with formation of said bead, and linkage joining said last mentioned cam and the free end of said laterally positioned bar to raise and lower the same whereby the cam on said vertical shaft may be moved to spread said fingers, and means operated by said last mentioned cam to raise and lower said form from and to beading position.

STANLEY S. MILLEN.